Feb. 3, 1942.  C. G. REEMES ET AL  2,272,019
WHEEL
Filed Sept. 6, 1940  2 Sheets-Sheet 1
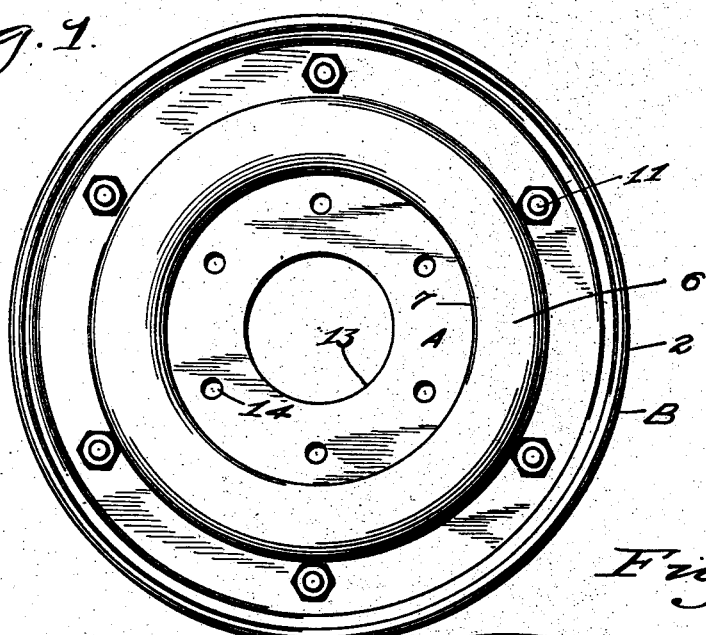
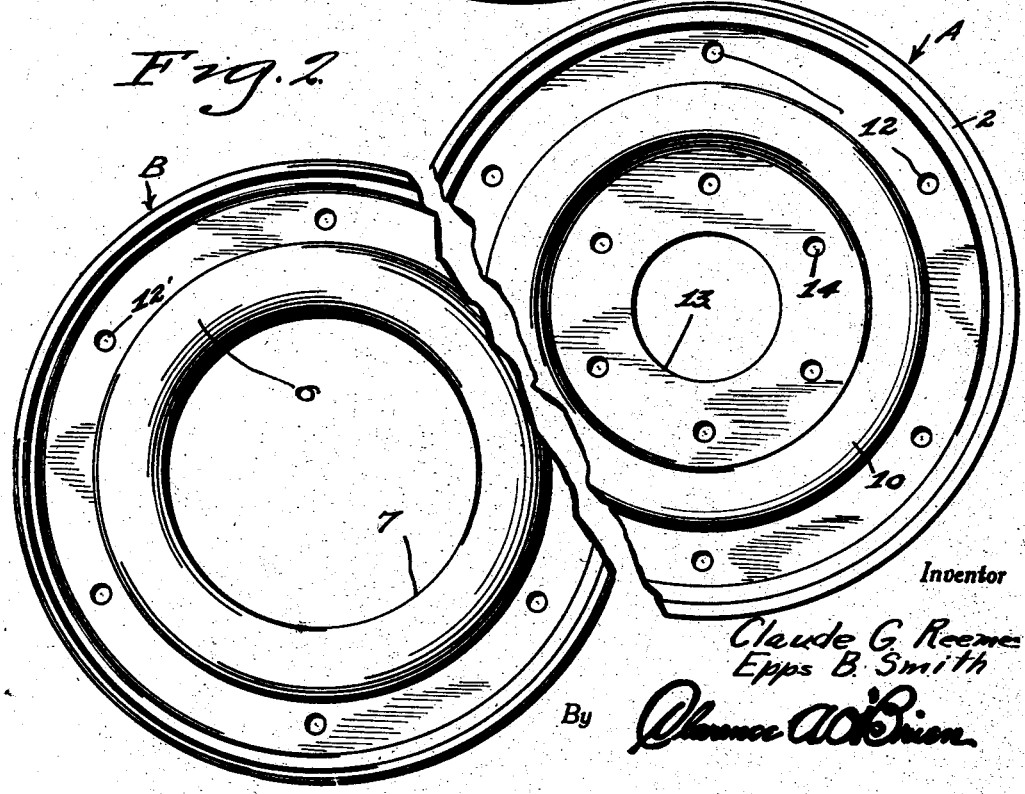
Inventor
Claude G. Reemes
Epps B. Smith
By
Attorney

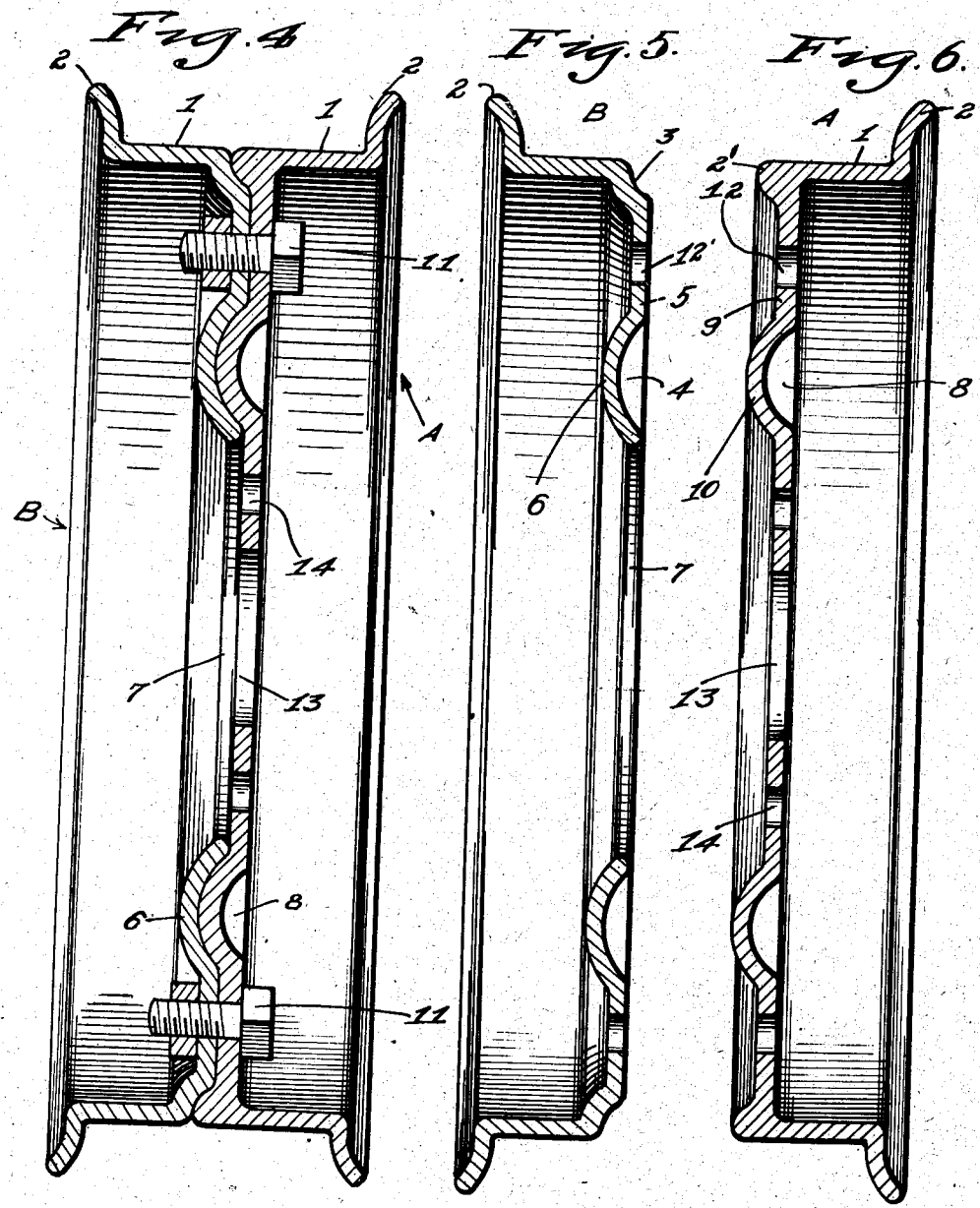

Patented Feb. 3, 1942

2,272,019

UNITED STATES PATENT OFFICE 2,272,019

WHEEL

Claude G. Reemes and Epps B. Smith, Little Rock, Ark., assignors of one-third to Harry Lasker, Little Rock, Ark.

Application September 6, 1940, Serial No. 355,688

1 Claim. (Cl. 301—63)

This invention relates to improvements in wheels, the general object of the invention being to form the wheel of a main section and a removable section, the rims of the two sections being constructed to hold a tire, with means for detachably connecting the sections together so that by removing the outer or removable section the tire can be readily removed and replaced with but little effort.

Another object of the invention is to provide the two sections with aligning means made in the form of annular grooves which form annular ribs so that by placing a rib of one section in a groove of the other section the two sections will be properly aligned and these parts act to reinforce the sections and the rib forming groove of the detachable section serves to receive its pro rata part of the radial force exerted toward the center of the wheel by contact of the tire with the road surface and transmit such radial force to the main wheel section at the union of the aforementioned annular ribs and grooves as well as at those points where the wheel bolts hold the two rim sections together.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 1 is a view looking toward the outer face of the improved wheel with the two sections connected together.

Figure 2 is a view looking toward the outer face of the outer or removable section.

Figure 3 is a similar view of the main section.

Figure 4 is a sectional view taken through the complete wheel.

Figure 5 is a sectional view taken through the outer section.

Figure 6 is a view taken through the main section.

As shown in these views the wheel is composed of the main section A and the removable section B. Each section is formed with a rim 1 and a flange 2 and at the inner edge of the rim 1 of section A an annular bead 2' is formed which extends substantially circumferentially and is adapted to engage an annular ledge 3 formed by a groove at the inner edge or annular corner of the rim of the section B. A groove 4 is formed in the web 5 of the section B and this groove forms an annular bead or concave convex part 6. A large circular hole 7 is formed by the web 5 with the wall of the opening being formed by the inner circumference of the part 6. An annular groove 8 is formed in the web 9 of the section A which provides an annular rib 10 on the outer face of the web of section A and this rib 10 is adapted to fit in the groove 4 when the parts are placed together and the two sections are fastened together by the bolts 11 as shown in Figures 1 and 4, the bolts passing through the holes 12 and 12' in the webs of the two sections, the holes being placed outwardly of the parts 10 and 6. A much smaller hole 13 is formed at the center of the web 9 than is formed in the web 5 of section B and an annular row of holes 14 is formed in the web 9, this row surrounding the opening 13. This opening receives the end of the hub and bolts are adapted to pass through the holes 14 into the hub to connect the section A with the hub. This section A remains in place on the hub, unless it is desired to remove it but the section B is removed every time a tire is to be changed and this is done by removing the bolts 11 so that the section B can be removed from the section A.

As will be seen the ribs 6 and 10 act as centering or aligning means for as the section B is placed against the section A the groove 4 will slide over the rib 10 and thus properly align the two sections and, of course, the bead 2' entering the groove 3 will also act as a counteracting centering means or force and in addition serving as a counteracting centering device the annular bead 2' also serves to place the greater portion of the radial force on the section A which is connected directly with the hub.

Also these parts 6 and 10 will greatly strengthen the webs of the two sections and the rib 6 fitting over the rib 10 will help the bolts 11 to carry the load exerted on the section B by the tire engaging the road surface and thus act to prevent any possible misalignment of the section B with the section A. These parts act to automatically align the two sections when the bolts 11 are tightened.

This wheel will make the changing of tire a very simple operation and there will be no danger of damaging the wheel or the tire when the tire is being changed. The manufacture of both the main part of the wheel and the complementary part B can be accomplished by one operation for each section. There will be no additional stamping, tooling or welding so that upon removal from the press of either section they will be ready for painting and assembling. Thus the wheel can be manufactured to sell at low cost.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A wheel of the class described comprising a main section including a web, a rim portion and a rim flange at the free edge of the rim portion, said web having a hub receiving centrally arranged hole therein and an annular rib on its outer face of concavo-convex shape in cross section, a removable section including a web having a large hole in its center, a rim portion and a rim flange connected with the free edge of the rim portion, said web of the removable section having an annular rib on its outer face, of concavo-convex shape in cross section, the rib of the removable section forming a groove receiving the rib of the main section when the two sections are placed together, and thereby aligning the two sections and also acting to transmit vertical force exerted on the removable section to the main section and bolts for detachably connecting the two sections together, an annular rib on the outer edge of the rim portion of the main section forming an outwardly extending extension of the said rim and a ledge forming groove in the annular corner of the inner face of the removable section for receiving the last-mentioned rib when the two sections are placed together, said ledge and rib acting to transmit the major portion of the vertical load force on the removable section to the main section, the rib of the removable section defining the hole in the web of said section to strengthen the web around said hole.

CLAUDE G. REEMES.
EPPS B. SMITH.